United States Patent
Yamamoto

(10) Patent No.: US 9,873,478 B2
(45) Date of Patent: Jan. 23, 2018

(54) SWING ARM

(71) Applicant: SUZUKI MOTOR CORPORATION, Hamamatsu-shi, Shizuoka (JP)

(72) Inventor: Takayo Yamamoto, Hamamatsu (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 0 days.

(21) Appl. No.: 15/271,849

(22) Filed: Sep. 21, 2016

(65) Prior Publication Data

US 2017/0088227 A1    Mar. 30, 2017

(30) Foreign Application Priority Data

Sep. 29, 2015 (JP) ................................ 2015-190807

(51) Int. Cl.
  *B62K 11/00*  (2006.01)
  *B62K 19/12*  (2006.01)
  *B62K 25/28*  (2006.01)

(52) U.S. Cl.
  CPC ............ *B62K 19/12* (2013.01); *B62K 25/283* (2013.01)

(58) Field of Classification Search
  CPC .............................. B62K 19/12; B62K 25/283
  USPC ........................................................ 280/288
  See application file for complete search history.

(56) References Cited

U.S. PATENT DOCUMENTS

| 4,887,687 | A | * | 12/1989 | Asai | B62K 19/12 180/219 |
| 5,741,026 | A | * | 4/1998 | Bonnville | B62D 21/02 280/288 |
| 5,791,673 | A | * | 8/1998 | Patterson | B62K 3/10 280/226.1 |
| 2005/0284681 | A1 | * | 12/2005 | Satou | B62K 25/283 180/227 |
| 2008/0073140 | A1 | * | 3/2008 | Seger | B62K 25/283 180/227 |

FOREIGN PATENT DOCUMENTS

JP        2006-69439 A    3/2006

* cited by examiner

*Primary Examiner* — Joseph M Rocca
*Assistant Examiner* — Conan D Duda
(74) *Attorney, Agent, or Firm* — Stein IP, LLC

(57) ABSTRACT

There is provided a swing arm configured to be coupled to a vehicle body frame to be vertically swingable via a pivot shaft. A main body has a pivot pipe in which the pivot shaft is to be inserted. A pair of right and left arm parts extend rearward from the main body. The main body is made by casting to have a hollow structure. The main body is provided with a rib configured to vertically partition an internal space thereof. The rib is connected to the pivot pipe at a place spaced from a connection place between the pivot pipe and an outer wall part defining an outer surface shape of the main body.

2 Claims, 6 Drawing Sheets

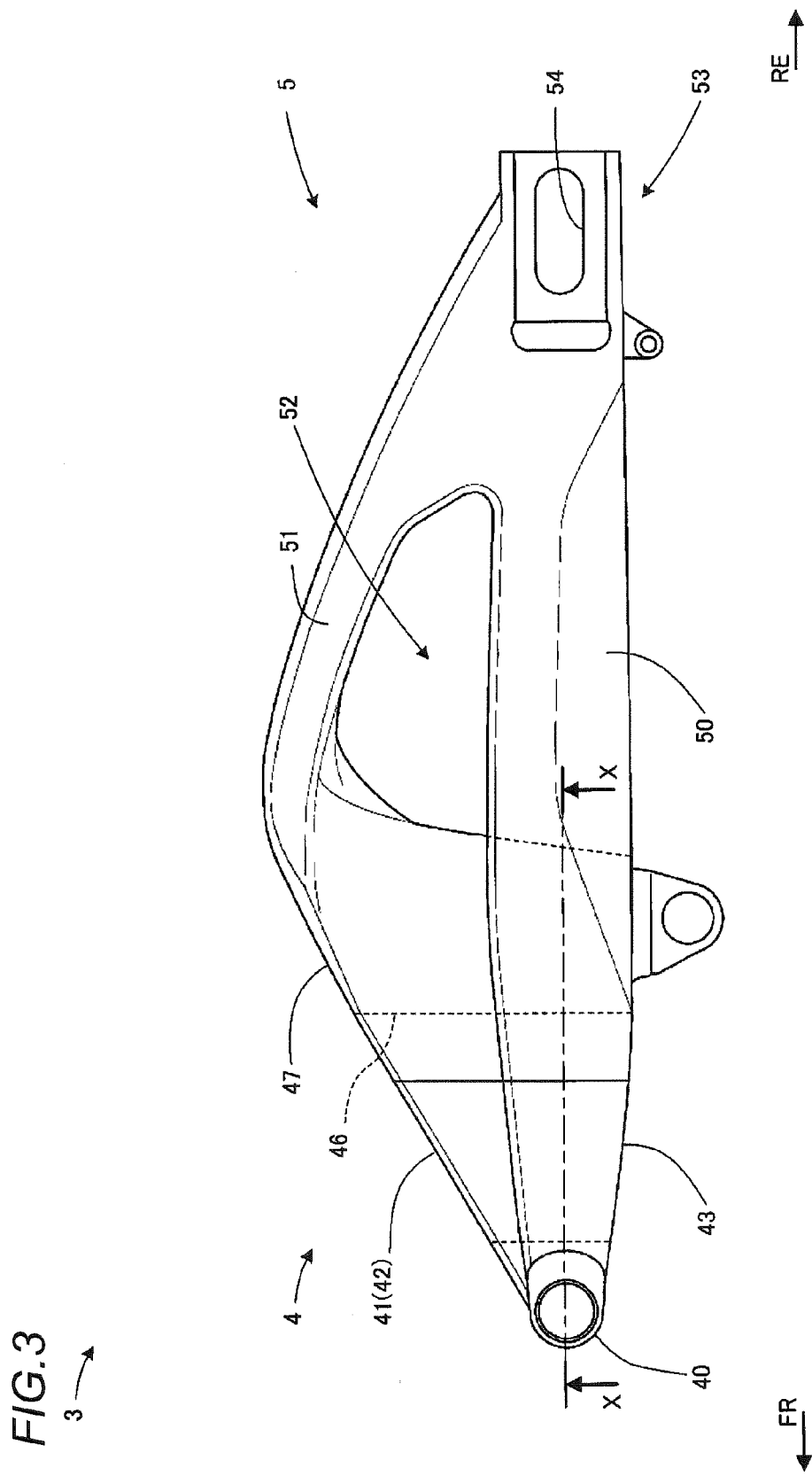

SWING ARM

CROSS-REFERENCE TO RELATED APPLICATIONS

The disclosure of Japanese Patent Application No. 2015-190807 filed on Sep. 29, 2015, including specification, drawings and claims is incorporated herein by reference in its entirety.

TECHNICAL FIELD

The disclosure relates to a swing arm, and more particularly, to a swing arm to be formed by casting.

BACKGROUND

For a two-wheeled motor vehicle of a sports type required to have speed and flexible controllability, a vehicle body is required to have appropriate strength and rigidity so as to secure control stability in a high-speed area. A swing arm adopted for the two-wheeled motor vehicle is manufactured by forming a plurality of members through casting and welding respective components (for example, refer to Patent Document 1).

The swing arm disclosed in Patent Document 1 has a main body coupled to a pivot shaft of a vehicle body frame and a pair of arm parts extending rearward from right and left sides of the main body, and is integrally configured by forming respective members through casting and then welding the same. For both high rigidity and weight saving, the swing arm has a hollow internal structure and is provided with a rib for partitioning an internal space. Particularly, the main body has a substantially triangular shape, as seen from a side, in which a pivot pipe into which the pivot shaft is to be inserted is configured as one corner part, and is provided with the rib for partitioning a space in the main body.

An outer wall part defining an outer surface shape of the main body and the rib are connected to the pivot pipe at the same place, and an angle between the outer wall part and the rib is an acute angle. The acute angle part (tapered shape) is a cause of cracks when forming the swing arm by the casting. Therefore, as countermeasures against the cracks, a method of forming the acute angle part into a fillet shape and securing a casting thickness has been adopted.

Patent Document 1: Japanese Patent Application Publication No. 2006-69439A

However, according to the above configuration, an unnecessary thickness is required so as to secure a casting thickness, so that a weight of the swing arm increases by the unnecessary thickness.

SUMMARY

It is therefore an object of the present invention to provide a swing arm that can be made light without an unnecessary thickness for securing a casting thickness.

According to an aspect of the embodiments of the present invention, there is provided a swing arm configured to be coupled to a vehicle body frame to be vertically swingable via a pivot shaft, the swing arm comprising: a main body having a pivot pipe in which the pivot shaft is to be inserted; and a pair of right and left arm parts extending rearward from the main body, wherein the main body is made by casting to have a hollow structure, wherein the main body is provided with a rib configured to vertically partition an internal space thereof, and wherein the rib is connected to the pivot pipe at a place spaced from a connection place between the pivot pipe and an outer wall part defining an outer surface shape of the main body.

According to the above configuration, the rib is connected to the pivot pipe at the place spaced from the connection part between the outer wall part of the main body and the pivot pipe, so that the outer wall part and the rib are not directly connected. For this reason, it is possible to prevent the connection parts of the outer wall part and the rib to the pivot pipe from becoming an acute angle shape, and it is not necessary to provide an unnecessary thickness for securing a casting thickness. As a result, it is possible to lighten the swing arm.

In the swing arm, the outer wall part of the main body may have an upper wall part extending obliquely upward from an outer surface of the pivot pipe and a lower wall part extending horizontally from the outer surface of the pivot pipe, and the rib may be provided between the upper wall part and the lower wall part and one end of the rib may be connected toward a center of the pivot pipe. According to the above configuration, the rib is provided between the upper wall part and the lower wall part, and one end of the rib is connected toward the center of the pivot pipe, so that it is possible to form a shape of a core having no undercut, which is configured to form the hollow part of the main body. Therefore, upon formation of the core, it is not necessary to provide a slide mold, so that it is possible to save the mold cost.

In the swing arm, portions of the upper wall part and the rib may be parallel with each other in the vicinity of connection parts thereof with the pivot pipe. According to the above configuration, it is possible to secure strength and rigidity of the swing arm and to implement the weight saving by the simple shape of the rib.

The rib may be formed to conform to outer surfaces of the arm parts. According to the above configuration, the shape of the rib is made to conform to the outer surface shape of the arm parts. Thereby, the shape of the rib is simplified to save the design man-hour.

According to the disclosure, the rib is connected to the pivot pipe at the place spaced from the connection part between the outer surface of the main body and the pivot pipe, so that it is not necessary to provide an unnecessary thickness for securing a casting thickness and it is possible to lighten the swing arm.

BRIEF DESCRIPTION OF THE DRAWINGS

In the accompanying drawings:

FIG. 3 is a side view depicting the swing arm in accordance with the illustrative embodiment;

DETAILED DESCRIPTION OF THE EMBODIMENTS

Hereinafter, an illustrative embodiment of the disclosure will be described in detail with reference to the accompanying drawings. Meanwhile, in the below, an example where a swing arm of the disclosure is applied to a two-wheeled motor vehicle will be described. However, the disclosure is not limited thereto. For example, the swing arm of the disclosure may also be applied to a two-wheeled motor vehicle of other type, a three-wheeled motor vehicle of a buggy type, or the like. Also, regarding directions, a vehicle front side is denoted with an arrow FR, a vehicle rear side is denoted with an arrow RE, a vehicle left side is denoted with an arrow L, and a vehicle right side is denoted with an arrow R, respectively. Also, in the respective drawings, some configurations are omitted for convenience of explanations.

Figure 1:
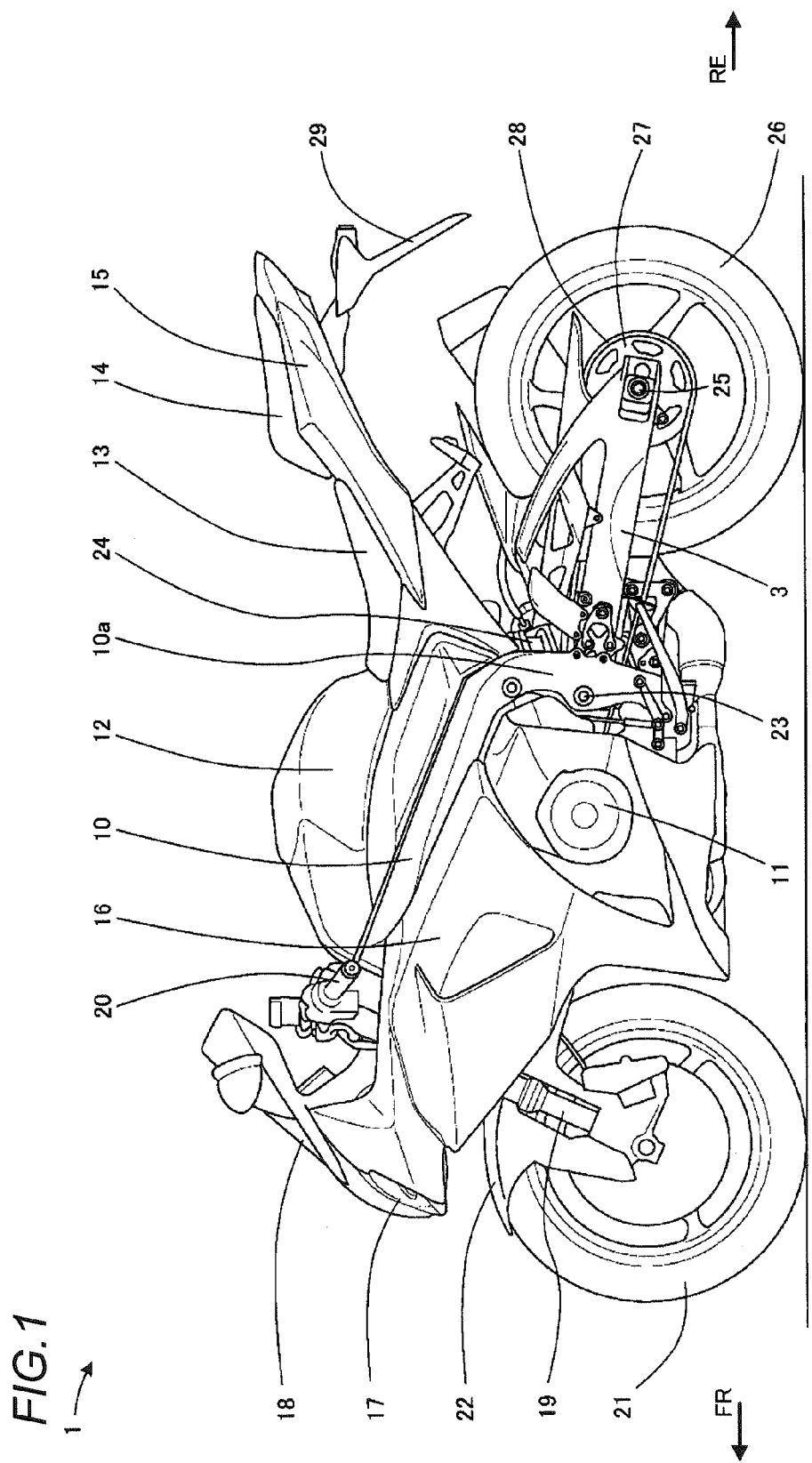
FIG. 1 is a side view depicting a schematic configuration of a two-wheeled motor vehicle in accordance with an illustrative embodiment.

A schematic configuration of a two-wheeled motor vehicle in accordance with an illustrative embodiment is described with reference to FIG. 1. FIG. 1 is a side view depicting a schematic configuration of a two-wheeled motor vehicle in accordance with an illustrative embodiment.

As shown in FIG. 1, a two-wheeled motor vehicle 1 is configured by mounting a variety of covers, which serve as an exterior member of a vehicle body, to a vehicle body frame 10 of a twin-spar type configured to mount thereto respective units such as a power unit, an electric system and the like and made of steel or aluminum alloy. The vehicle body frame 10 extends rearward from a front head part with being bifurcated to right and left, and is bent downward at a rear end-side. A front part of an engine 11 is suspended to a front end-side of the vehicle body frame 10, and a rear part of the engine 11 is suspended to the rear end-side of the vehicle body frame 10.

A fuel tank 12 is disposed at an upper part of the vehicle body frame 10. A driver seat 13 and a passenger seat 14 are disposed together with a rear cowl 15 at the rear of the fuel tank 12. A front half part of the vehicle body is covered by a front cowl 16. Also, a front surface of the front cowl 16 is provided with a head lamp 17, and a windscreen 18 is provided above the head lamp 17. A pair of right and left front forks 19 is steerably supported to the front head part of the vehicle body frame 10, together with a handle bar 20. A front wheel 21 is rotatably supported to lower parts of the front forks 19, and the upper of the front wheel 21 is covered by a front fender 22.

Also, a rear part of the vehicle body frame 10 is configured by a body frame 10a, and a swing arm 3 is coupled thereto to be vertically swingable via a pivot shaft 23. A rear wheel suspension 24 is attached between the vehicle body frame 10 and the swing arm 3. The swing arm 3 is made of an aluminum-based casting material, for example. In the meantime, the material of the swing arm is not limited thereto and may be formed of, other metal materials such as magnesium. A rear wheel 26 is rotatably supported to a rear end portion of the swing arm 3 via an axle 25. A left side of the rear wheel 26 is provided with a driven sprocket 27, and power of the engine 11 can be transmitted to the rear wheel 26 by a drive chain 28. The upper of the rear wheel 26 is covered by a rear fender 29 provided at a rear part of the rear cowl 15.

Figure 2:
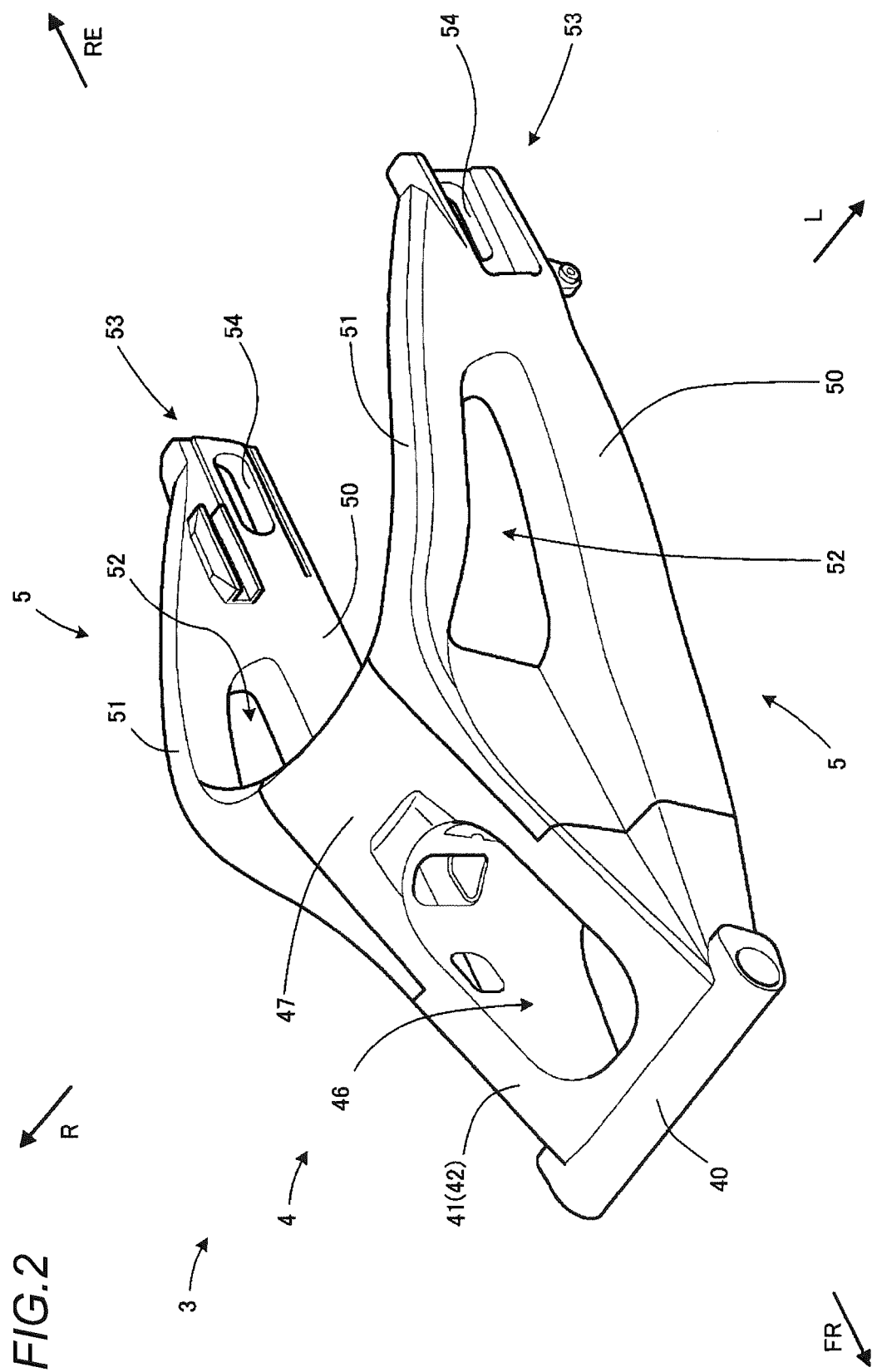
FIG. 2 is a perspective view of the swing arm in accordance with the illustrative embodiment.

Subsequently, a configuration of the swing arm in accordance with the illustrative embodiment is described with reference to FIGS. 2 and 3. FIG. 2 is a perspective view of the swing arm in accordance with the illustrative embodiment. FIG. 3 is a side view depicting the swing arm in accordance with the illustrative embodiment.

As shown in FIGS. 2 and 3, the swing arm 3 includes a main body 4 coupled to the vehicle body frame 10 (refer to FIG. 1) and a pair of right and left arm parts 5 extending rearward from the main body 4 and configured to rotatably support the rear wheel 26 (refer to FIG. 1) to rear end portions thereof. The main body 4 configures a front half part of the swing arm 3, and the pair of right and left arm parts 5 configures a rear half part of the swing arm 3. The main body 4 and the pair of right and left arm parts 5 are respectively made by casting and are bonded by welding, so that the swing arm 3 is integrally configured.

The main body 4 has a pivot pipe 40 extending in a vehicle width direction. A pivot shaft 23 (refer to FIG. 1) is inserted into the pivot pipe 40. The main body 4 has a substantially triangular shape in which the pivot pipe 40 is configured as one corner part, as seen from a side. More specifically, the main body 4 includes, as an outer wall part 41 defining an outer surface shape, an upper wall part 42 extending obliquely upward from an outer surface of the pivot pipe 40 toward the rear and a lower wall part 43 (which is shown in FIG. 3 only) extending horizontally from the outer surface of the pivot pipe 40 toward the rear.

As described above, the main body 4 is made by the casting and has a hollow structure having a predetermined space therein. In the meantime, although described in detail later, the main body 4 is provided therein with a rib 45 configured to partition an internal space 6 (refer to FIG. 4B). Also, the main body 4 is formed at its substantial center with an opening 46 penetrating the upper wall part 42 toward the lower wall part 43, as seen from a side. The main body 4 configures a cross part 47 configured to couple the pair of right and left arm parts 5 at a more rear side than the opening 46.

The pair of right and left arm parts 5 is symmetrically formed. The arm part 5 has a main arm 50 extending horizontally from the main body 4 (a lower part of the cross part 47) toward the rear and a sub-arm 51 extending obliquely downward from an upper end of the cross part 47 toward the rear. The main arm 50 and the sub-arm 51 are respectively connected at rear end portions. Thereby, an opening 52 for enabling the drive chain 28 (refer to FIG. 1) to pass therethrough is formed between the main arm 50 and the sub-arm 51.

Also, a rear end portion of the arm part 5 (the connection part between the main arm 50 and the sub-arm 51) configures an axle support part 53 configured to support the axle 25 (refer to FIG. 1) of the rear wheel 26. The axle support part 53 is formed with a hole portion 54 for inserting therein the axle 25. The hole portion 54 has a long hole shape, which is long in the front-rear direction, and is configured to adjust a position in the front-rear direction of the rear wheel 26, i.e., to adjust tension of the drive chain 28.

The swing arm 3 configured as described above is applied to a two-wheeled motor vehicle of a sports type, particularly, and is required to have strength and rigidity capable of enduring speed, and further to have a balanced weight, which is a very important technical object. In recent years, for the weight balance, the swing arm is cast by aluminum alloy and is made to have a hollow internal structure. Thereby, the high-strength and lightweight swing arm is implemented. However, as the technology is advanced, the swing arm shape is complicated. As a result, the mold cost increases and the additional weight saving is required.

Therefore, the inventors conceived the disclosure, paying attention to the internal structure of the swing arm. That is, the gist of the disclosure is to exclude an unnecessary thickness for securing a casting thickness by changing a shape of the rib configured to partition the internal space of the swing arm. Thereby, it was possible to implement the weight saving of the swing arm while securing the strength with a simple configuration. Also, it was possible to save the mold cost by simplifying a core shape for molding the swing arm.

Figure 4A:
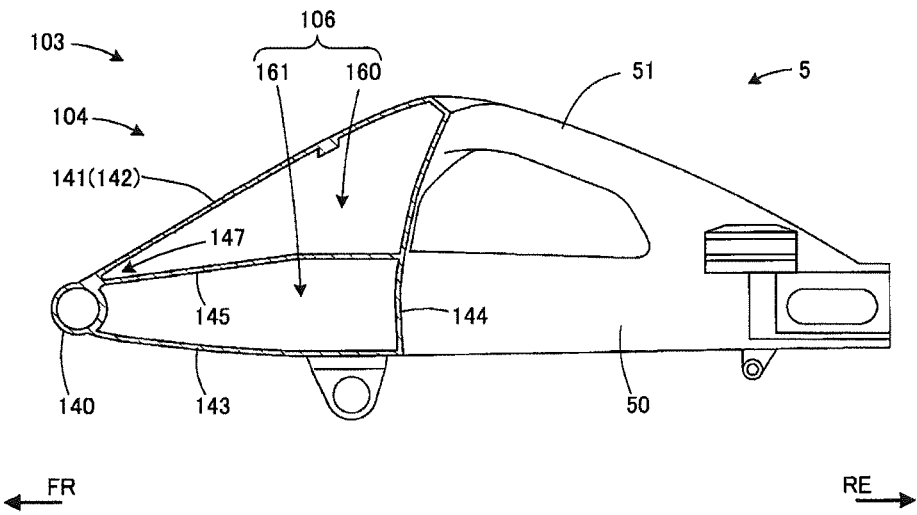
FIGS. 4A and 4B are longitudinally sectional views of the swing arm.
Figure 4B:
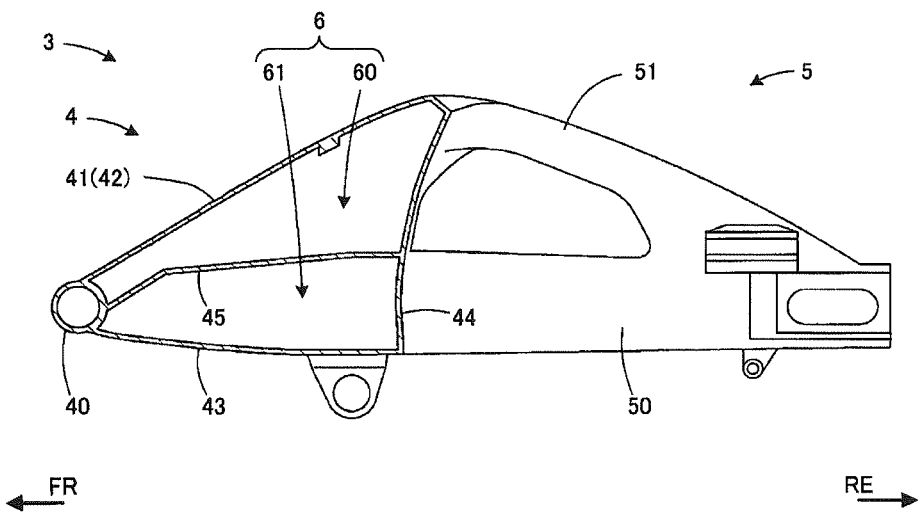
Figure 5A:
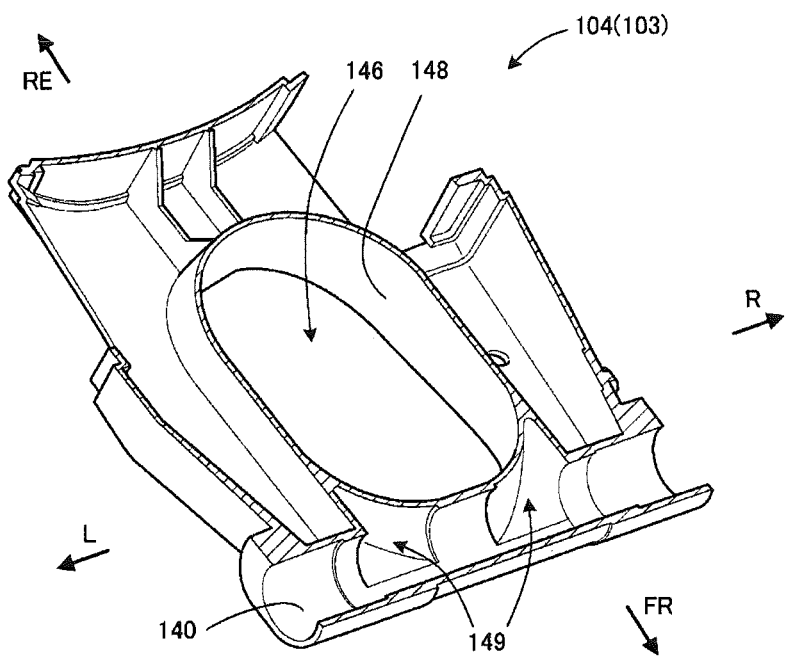
FIGS. 5A and 5B are sectional views of the swing arm taken along a line X-X of FIG. 3.
Figure 5B:
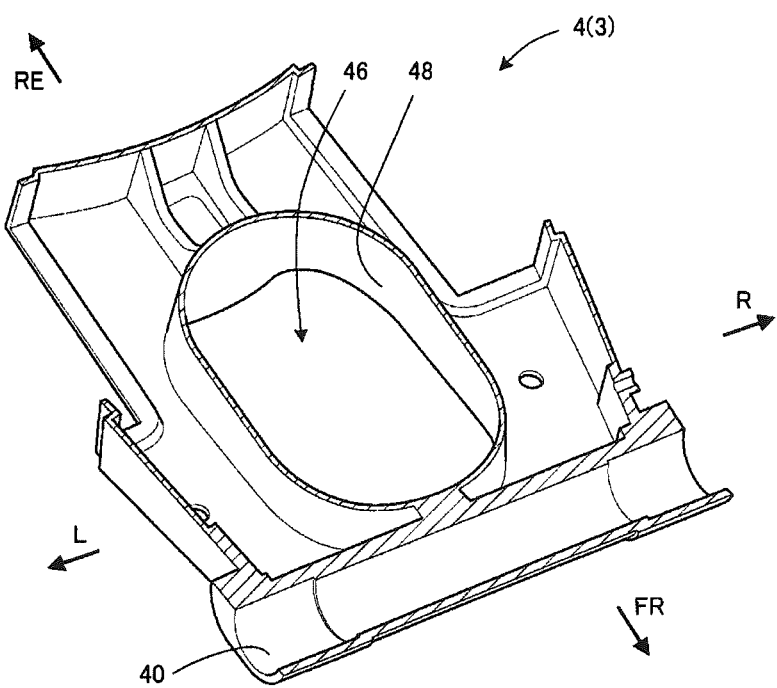

Subsequently, the internal structure of the swing arm of the illustrative embodiment, particularly, the internal structure of the main body is described with reference to FIGS. 4A to 5B while referring to a comparative example. FIGS. 4A and 4B are longitudinally sectional views of the swing arm. FIG. 4A is a longitudinally sectional view of a swing arm in accordance with a comparative example (related art) and FIG. 4B is a longitudinally sectional view of the swing arm in accordance with the illustrative embodiment. FIGS. 5A and 5B are sectional views of the swing arm taken along a line X-X of FIG. 3. FIG. 5A is a sectional perspective view of the swing arm in accordance with the comparative example, and FIG. 5B is a sectional perspective view of the swing arm in accordance with the illustrative embodiment.

Meanwhile, in the comparative example of FIGS. 4A and 5A, an outward shape is the same as the illustrative embodiment, and only a shape of the rib configured to partition the internal space of the main body is different from the illustrative embodiment. For this reason, in the comparative example, the same configurations as the illustrative embodiment are denoted with the same reference numerals for convenience of explanations, and the descriptions thereof are omitted.

First, the comparative example is described. As shown in FIG. 4A, in a swing arm 103 of the comparative example, an outer wall part 141 defining an outer surface shape of a main body 104 has a substantially triangular shape, as seen from a side. More specifically, the outer wall part 141 has an upper wall part 142, a lower wall part 143 and an upright wall part 144 extending vertically. The upright wall part 144 is configured to connect an upper end of the upper wall part 142 and a rear end of the lower wall part 143. Thereby, an internal space 106 surrounded by the upper wall part 142, the lower wall part 143 and the upright wall part 144 is formed in the main body 104.

Also, a rib 145 configured to vertically partition the internal space 106 and extending forward from the upright wall part 144 is formed between the upper wall part 142 and the lower wall part 143. Thereby, the internal space 106 is partitioned into two spaces of an upper space 160 and a lower space 161. One end (tip) of the rib 145 is connected to contact an outer surface of a pivot pipe 140, and the other end (rear end) of the rib 145 is connected to a substantially central portion in the upper-lower direction of the upright wall part 144.

More specifically, the upper wall part 142 is connected to the outer surface of the pivot pipe 140 so that it extends in a tangential direction, and the rib 145 is connected to the pivot pipe 140 at the same place as the connection place between the upper wall part 142 and the pivot pipe 140. Thereby, the upper wall part 142 and the rib 145 are directly connected, so that an angle between the upper wall part 142 and the rib 145 becomes an acute angle. In this case, when casting the main body 104, an acute angle part 147 becomes a cause of a crack. Therefore, in the comparative example, the acute angle part 147 is formed into a fillet shape (R shape) to secure a casting thickness. Thereby, the crack generation at the acute angle part 147 is suppressed.

However, an unnecessary casting material, so-called unnecessary thickness is required so as to form the acute angle part 147 into the fillet shape. As a result, not only a weight of the swing arm 103 but also the material cost increases.

In contrast, according to the illustrative embodiment, as shown in FIG. 4B, the outer wall part 41 defining the outer surface shape of the main body 4 is configured by the upper wall part 42, the lower wall part 43 and an upright wall part 44 extending vertically. The upper wall part 42 and the lower wall part 43 are connected to the outer surface of the pivot pipe 40 so that they extend in tangential directions, and the upright wall part 44 is configured to connect an upper end of the upper wall part 42 and a rear end of the lower wall part 43. Thereby, the internal space 6 surrounded by the upper wall part 42, the lower wall part 43 and the upright wall part 44 is formed in the main body 4.

Also, the rib 45 configured to vertically partition the internal space 6 and extending forward from the upright wall part 44 is formed between the upper wall part 42 and the lower wall part 43. More specifically, the rib 45 extends forward from the upright wall part 44 in a substantially horizontal direction (along the outer surface shape of the main arm 50), is bent downward obliquely at a front side of the main body 4 to extend in parallel with the upper wall part 42 and is then connected to the pivot pipe 40. Thereby, the internal space 6 is partitioned into two spaces of an upper space 60 and a lower space 61. Also, the rib 45 is positioned at a boundary part between the main arm 50 and the sub-arm 51.

In this way, one end (tip) of the rib 45 is connected toward the center of the pivot pipe 40, and the other end (rear end) of the rib 45 is connected to a substantially central portion in the upper-lower direction of the upright wall part 44. That is, the rib 45 is connected to the pivot pipe 40 at a place spaced from the connection place between the upper wall part 42 and the pivot pipe 40. More specifically, one end of the rib 45 is connected at a position at which an arc part of the pivot pipe 40 between the upper wall part 42 and the lower wall part 43 is bisected.

For this reason, the upper wall part 42 and the rib 45 are not directly connected, so that the acute angle part (refer to FIG. 4A) of the comparative example, i.e., the tapered shape is not formed in the illustrative embodiment. Therefore, the unnecessary thickness for securing the casting thickness is not required, so that the swing arm 3 can be made light. Also, although described in detail later, the arc part of the pivot pipe 40 defining the lower space 61 of the main body 4 can be made smaller than the comparative example. Thereby, it is possible to simplify a mold for core for forming the lower space 61.

Further, as described above, the rib 45 is formed to conform to the outer surface of the main arm 50 and portions of the upper wall part 42 and the rib 45 are parallel with each other in the vicinity of the connection parts with the pivot pipe 40, so that it is possible to secure the rigidity and to save the weight by the simple shape of the rib 45. As a result, it is possible to reduce a design man-hour.

Also, in the main body 104 of the comparative example, the acute angle part 147 is formed by the upper wall part 142 and the rib 145, and the acute angle part 147 is provided with the unnecessary thickness to form the fillet shape. As a result, as shown in FIG. 5A, a method of removing the unnecessary thickness at a place different from the acute angle part 147 for only a part of which a weight has increased is adopted. More specifically, a pair of right and left recess portions 149 is formed at a connection part between a cylindrical sidewall part 148 defining an opening 146 of the main body 104 and the pivot pipe 140. The recess portion 149 has a substantially triangular shape between the internal space of the pivot pipe 140 and the sidewall part 148, as seen from top.

In the meantime, the swing arm 103 made by the casting is subjected to painting processing at the finishing. The painting processing is performed with at a state where the swing arm 103 is suspended with a hole of the pivot pipe 140 serving as a support point. That is, the pivot pipe 140 is directed upward and the axle support part 53 (refer to FIG. 3) is directed downward. In this case, the paint applied into the pivot pipe 140 remains in the recess portions 149, so that a liquid pool is caused. Also, the core shape for forming a shape in the pivot pipe 140 becomes complicated, so that the cost of a mold configured to form the core increases.

In contrast, according to the illustrative embodiment, since the acute angle part 147 (refer to FIG. 4A) is omitted from the beginning, it is not necessary to separately remove the unnecessary thickness. Therefore, as shown in FIG. 5B, the recess portion is not formed between a sidewall part 48 defining the opening 46 of the main body 4 and the pivot pipe 40. As a result, when painting the swing arm 3, it is possible to prevent the formation of a liquid pool of paint in the pivot pipe 40. Further, since the internal space of the pivot pipe 40 is cylindrical, it is possible to simplify the mold configured to form the core.

Figure 6A:
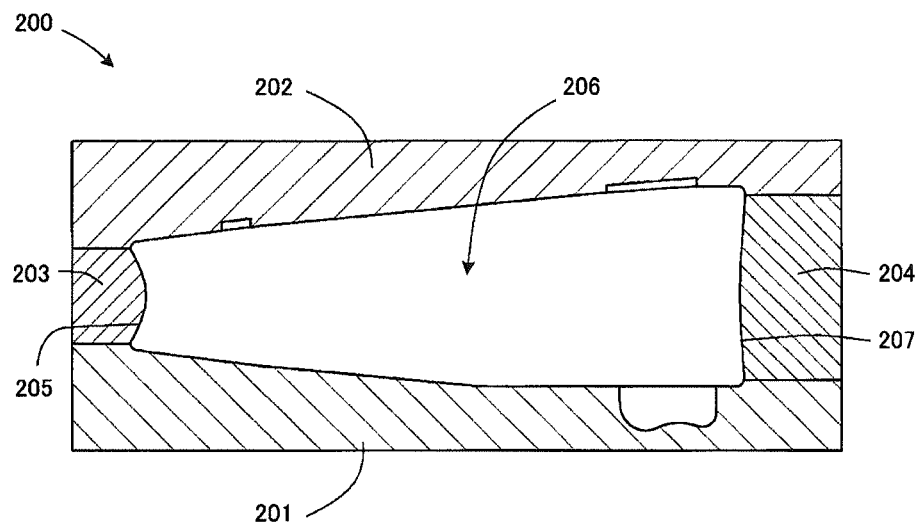
FIGS. 6A and 6B are sectional views of a mold configured to form a core necessary for molding of a swing arm.
Figure 6B:
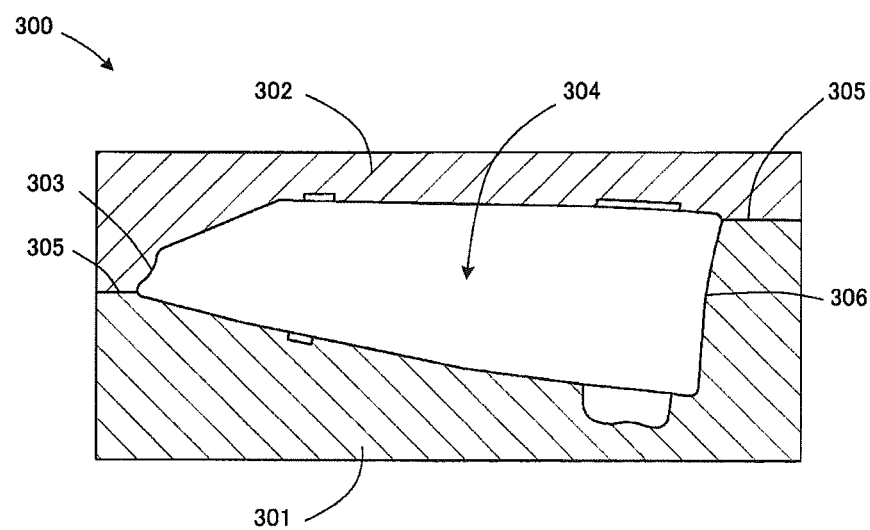

Subsequently, the core for forming the internal space (lower space) of the main body is described with reference to FIGS. 6A and 6B. FIGS. 6A and 6B are sectional views of a mold configured to form a core necessary for molding of the swing arm (main body). FIG. 6A is a sectional view of a mold for core according to the comparative example, and FIG. 6B is a sectional view of a mold for core according to the illustrative embodiment. Meanwhile, in the below, a core for forming a lower space of the internal space of the main body is described. Also, a shape of the core (mold) shown in FIG. 6A corresponds to the shape of the swing arm (main body) shown in FIGS. 4A and 5A, and a shape of the core shown in FIG. 6B corresponds to the shape of the swing arm shown in FIGS. 4B and 5B.

As described above, when forming the main body by the casting, it is necessary to beforehand prepare a core corresponding to a shape of the lower space so as to form the internal space (particularly, the lower space). The core is formed with a sand mold, for example. After casting the main body, it is possible to obtain a shape of a desired internal space by breaking the core. In the meantime, the core is not limited to the sand mold, and may be configured by a dedicated slide mold.

As shown in FIG. 6A, a mold 200 for core according to the comparative example has a cavity mold 201 configured to form an upper shape of the internal space 106 (lower space 161 (refer to FIG. 4A)), a core mold 202 configured to form a lower shape of the lower space 161, a first slide mold 203 configured to form a front part shape of the lower space 161, and a second slide mold 204 configured to form a rear part shape of the lower space 161. The cavity mold 201 is fixed, and the core mold 202 is configured to be vertically moveable relative to the cavity mold 201. Also, the first slide mold 203 and the second slide mold 204 are configured to be horizontally moveable.

As described above, in the swing arm 103 of the comparative example, the rib 145 configured to vertically partition the internal space 106 of the main body 104 is connected to the pivot pipe 140 at the same place as the connection place between the upper wall part 142 and the pivot pipe 140 (refer to FIG. 4A). For this reason, the arc part of the pivot pipe 140 defining the lower space 161 of the main body 104 is longer than the illustrative embodiment. Since the arc part (a front end portion 205 of a core 206) configures an undercut upon formation of the core 206, the first slide mold 203 is required for the mold 200 for core. Also, a rear end portion of the lower space 161 (a rear end portion 207 of the core 206) has an R shape where the upright wall part 144 (refer to FIG. 4A) is slightly concave forward, and configures an undercut. For this reason, the second slide mold 204 is required for the mold 200 for core.

Like this, according to the comparative example, since the shape of the core 206 has the undercuts, the first slide mold 203 and the second slide mold 204 are necessarily provided. As a result, the cost of the mold 200 for core additionally increases by the first slide mold 203 and the second slide mold 204.

In contrast, a mold 300 for core of the illustrative embodiment has a cavity mold 301 configured to form a lower shape of the internal space 6 (lower space 61 (refer to FIG. 4B)) and a core mold 302 configured to form an upper shape of the lower space 61, as shown in FIG. 6B. The cavity mold 301 is fixed, and the core mold 302 is configured to be vertically moveable relative to the cavity mold 301.

As described above, in the swing arm 3 of the illustrative embodiment, one end of the rib 45 configured to vertically partition the internal space 6 of the main body 4 is directed toward the center of the pivot pipe 40, and is connected to the pivot pipe 40 at the place spaced from the connection place between the upper wall part 42 and the pivot pipe 40 (refer to FIG. 4B). For this reason, it is possible to make the arc part (a front end portion 303 of a core 304) of the pivot pipe 40 defining the lower space 61 of the main body 4 shorter than the comparative example.

Also, the core 304 is inclined so that the front end portion 303 of the core 304 ascends upwards, and a partitioning surface 305 of the mold 300 for core is configured by a front lower part (the lowest part of the arc part 303) of the core 304 and a rear upper part of the core 304. That is, a separation direction of the core mold 302 with respect to the cavity mold 301 is inclined. Thereby, it is possible to omit parts becoming the undercuts at the front and rear end portions of the core 304. Therefore, it is possible to omit the first slide mold 203 and the second slide mold 204, which are necessarily provided in the comparative example, so that it is possible to simplify the mold 300 for core. For this reason, it is possible to save the cost of the mold 300 for core and to improve the productivity.

As described above, according to the illustrative embodiment, the rib 45 is connected to the pivot pipe 40 at the place spaced from the connection part between the outer wall part 41 (upper wall part 42) of the main body 4 and the pivot pipe 40, so that the upper wall part 42 and the rib 45 are not directly connected. For this reason, it is possible to prevent the connection parts of the upper wall part 42 and the rib 45 to the pivot pipe 40 from becoming an acute angle shape, and it is not necessary to provide the unnecessary thickness for securing the casting thickness. As a result, it is possible to lighten the swing arm 3.

In the meantime, the disclosure is not limited to the illustrative embodiment and can be diversely changed and implemented. In the illustrative embodiment, the sizes, shapes and the like shown in the accompanying drawings are not limited thereto and can be appropriately changed within a scope of achieving the effects of the disclosure. In addition, the illustrative embodiment can be appropriately changed without departing from the object of the disclosure.

For example, in the illustrative embodiment, the main body 4 has a substantially triangular shape, as seen from a side. However, the disclosure is not limited thereto. For example, the main body 4 may have an arbitrary shape.

Also, in the illustrative embodiment, the connection configuration of the rib 45, which is configured to partition the internal space 6 of the swing arm 3, to the pivot pipe 40 has been described. However, the disclosure is not limited thereto. For example, the configuration of the rib 45 of the illustrative embodiment may also be applied to connection of the rib to a head pipe of the vehicle body frame.

Also, in the illustrative embodiment, one end of the rib 45 is directed toward the center of the pivot pipe 40, and is connected to the position at which the arc part of the pivot pipe 40 between the upper wall part 42 and the lower wall part 43 is bisected. However, the disclosure is not limited thereto. For example, the rib 45 may be connected to any position of the pivot pipe 40 inasmuch as it is not directly connected to the outer wall part 41.

As described above, the disclosure has the effects of omitting the unnecessary thickness for securing the casting thickness and lightening the swing arm, and is particularly useful for the swing arm that is to be formed by the casting.

What is claimed is:

1. A swing arm configured to be coupled to a vehicle body frame to be vertically swingable via a pivot shaft, the swing arm comprising:
    a main body having a pivot pipe in which the pivot shaft is to be inserted; and
    a pair of right and left arm parts extending rearward from the main body,
    wherein the main body is made by casting to have a hollow structure,
    wherein the main body is provided with a rib extending in a horizontal direction within an internal space of the main body to partition the internal space of the main body into an upper space and a lower space,
    wherein the rib is connected to the pivot pipe at a place spaced from a connection place between the pivot pipe and an outer wall part defining an outer surface shape of the main body,
    wherein the outer wall part of the main body has an upper wall part extending obliquely upward from an outer surface of the pivot pipe and a lower wall part extending horizontally from the outer surface of the pivot pipe,
    wherein the rib is provided between the upper wall part and the lower wall part,
    wherein one end of the rib is connected to the pivot pipe at a position at which an arc-shaped part of the pivot pipe between the upper wall part and the lower wall part is bisected vertically,
    wherein the one end of the rib is connected toward a center of the pivot pipe, and
    wherein portions of the upper wall part and the rib are parallel with each other in the vicinity of connection parts thereof with the pivot pipe.

2. The swing arm according to claim 1, wherein the rib is formed to conform to outer surfaces of the arm parts.

* * * * *